(12) United States Patent
Gauffin et al.

(10) Patent No.: US 10,825,291 B2
(45) Date of Patent: *Nov. 3, 2020

(54) SYSTEM AND METHOD FOR PLAYING ONLINE GAME

(71) Applicant: Huuuge Global Ltd., Larnaca (CY)

(72) Inventors: Anton Gauffin, Berlin (DE); Wojciech Wronowski, Szczecin (PL)

(73) Assignee: Huuuge Global LTD., Larnaca (CY)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,205

(22) Filed: Apr. 1, 2019

(65) Prior Publication Data
US 2019/0347898 A1 Nov. 14, 2019

Related U.S. Application Data

(63) Continuation of application No. 15/975,948, filed on May 10, 2018, now Pat. No. 10,249,140.

(51) Int. Cl.
*A63F 9/24* (2006.01)
*G07F 17/32* (2006.01)
(Continued)

(52) U.S. Cl.
CPC ........ *G07F 17/3241* (2013.01); *A63F 13/497* (2014.09); *A63F 13/67* (2014.09);
(Continued)

(58) Field of Classification Search
CPC ........ A63F 13/12; A63F 13/79; A63F 13/825; A63F 13/86; A63F 13/87; A63F 2300/577
(Continued)

(56) References Cited

U.S. PATENT DOCUMENTS 6,273,820 B1 * 8/2001 Haste, III ................ G07F 17/32
273/143 R
7,632,186 B2 * 12/2009 Spanton ................ A63F 13/12
463/40

(Continued)

FOREIGN PATENT DOCUMENTS

WO 2011/011465 A1 1/2011

OTHER PUBLICATIONS

Jan Waveren JMP "The Quake 3 Arena Bot", Jun. 28, 2001, Revision 1, University of Technology Delft Faculty ITS, 118 pages. Available at: http://www.kbs.twi.tudelft.nl/docs/MSc/2001/WaverenJean-Paul van/thesis.pdf.

(Continued)

*Primary Examiner* — Michael A Cuff
(74) *Attorney, Agent, or Firm* — Ziegler IP Law Group, LLC

(57) ABSTRACT

A system and method for playing an online game. The system includes player devices associated with the online game and a server arrangement communicably coupled with the player devices. The server arrangement is configured to receive a request from a player device to initiate the online game; determine at least one passive player device based on predefined condition; transmit an authorization request to the at least one passive player device to play the online game as virtual player; receive an authorization response from the at least one passive player device; create at least one virtual player for the at least one passive player device, based upon the received authorization response, and initiate the online game among the at least one virtual player and the at least one player device, wherein the at least one passive player device is different from the at least one player device.

20 Claims, 3 Drawing Sheets

(51) Int. Cl.
*A63F 13/67* (2014.01)
*A63F 13/497* (2014.01)
*A63F 13/798* (2014.01)

(52) U.S. Cl.
CPC ...... *G07F 17/3223* (2013.01); *G07F 17/3227* (2013.01); *A63F 13/798* (2014.09)

(58) Field of Classification Search
USPC ...................................................... 463/29, 42
See application file for complete search history.

(56) References Cited

U.S. PATENT DOCUMENTS

| | | | | |
|---|---|---|---|---|
| 9,403,090 B2* | 8/2016 | Harris | ................... | A63F 13/537 |
| 2003/0038805 A1* | 2/2003 | Wong | ...................... | A63F 13/12 |
| | | | | 345/473 |
| 2003/0220143 A1* | 11/2003 | Shteyn | ................... | A63F 13/12 |
| | | | | 463/42 |
| 2006/0058103 A1* | 3/2006 | Danieli | ................... | A63F 13/12 |
| | | | | 463/42 |
| 2010/0178971 A1* | 7/2010 | Pfeiffer | ................... | G07F 17/32 |
| | | | | 463/11 |
| 2010/0222142 A1* | 9/2010 | Mori | ...................... | A63F 13/12 |
| | | | | 463/29 |
| 2011/0250974 A1* | 10/2011 | Shuster | ................... | G07F 17/32 |
| | | | | 463/43 |
| 2013/0044106 A1* | 2/2013 | Shuster | ................... | G06T 19/20 |
| | | | | 345/419 |
| 2013/0109454 A1* | 5/2013 | Wilkinson | .......... | G07F 17/3225 |
| | | | | 463/11 |
| 2018/0161675 A1* | 6/2018 | Miron | ................... | A63F 13/493 |

OTHER PUBLICATIONS

Marco Mamei, et al., "Field-Based Motion Coordination in Quake 3 Arena", Autonomous Agents and Multiagent Systems, IEEE, Proceedings of the Third International Joint Conference on New York, Jul. 19, 2004, pp. 1532-1533.

Stephan Zanetti, et al., "Machine learning techniques for FPS in Q3", Proceedings of the 2004 ACM Sigchi International Conference on Advances in Computer Entertainment Technology, ACM, Sep. 2, 2004, pp. 239-244.

Anonymous, "Drivatar—Forza Motorsport 5 Wiki Guide—IGN", Dec. 16, 2013, 3 pges. Available at: http: //www.ign.com/wikis/forza-5/Drivatar.

Anonymous, "Drivatar(TM) in Forza Motorsport—Microsoft Research", Apr. 19, 2014. Available at: https://web.archive.org/web/20140419214409/http: //research. microsoft. com/en-us/projects/drivatar/forza.aspx.

Anonymous, "In Forza Horizon 2, Computers Finally Drive as Crazy as Humans, WIRED", Sep. 25, 2014, 10 pages. Available at: https://www.wired.com/2014/09/forza-horizon-2-drivatars/.

Extended European Search Report issued in EP Application No. EP19171292.6 dated Sep. 18, 2019, 12 pages.

* cited by examiner

SYSTEM AND METHOD FOR PLAYING ONLINE GAME

TECHNICAL FIELD

The present disclosure relates generally to online games and more specifically, to systems for playing the online games. Furthermore, the present disclosure also relates to methods for playing the online games.

BACKGROUND

In recent times, online gaming has acquired an important place in an entertainment industry. Typically, a player performs one or more game related activities on a gaming apparatus to win an online game in a single player or a multiplayer mode. In the multiplayer online game, different players associated with the online game are connected to a game server through a communication network, such as Internet. Further, a gaming establishment is configured to promote multiplayer mode wherein multiple players participate as team members of a team or independently and perform activities in a collaborative manner to defeat an opponent team and earn credits/rewards.

However, there exist certain limitations associated with playing the aforementioned multiplayer online game. Firstly, the multiplayer online game may include multiple rounds to be achieved in order to win the multiplayer online game. In such an example, the players often do not have patience to play the all rounds as it is a time consuming activity. Such time consuming activities lead the players to lose their interest. To overcome the aforementioned problem, most of the multiplayer games are generally programmed to incorporate bots to play on the behalf of the player. However, such bots are inefficient and may not provide the desirable results. For example, when the connection between the player and the game server is lost, the bots are employed to play on the behalf of the player. If the player is playing a wager-based game, such bots may not earn the credits/rewards as desired by the player.

Therefore, in light of the foregoing discussion, there exists a need to overcome the aforementioned drawbacks associated with playing the online game.

SUMMARY

The present disclosure seeks to provide a system for playing an online game.

The present disclosure also seeks to provide a method for playing an online game.

The present disclosure seeks to provide a solution to the existing problem of playing the online game using a virtual player. An aim of the present disclosure is to provide a solution that overcomes at least partially the problems encountered in prior art, and provides a reliable, time-efficient, and easy to implement method and system for playing the online game.

In one aspect, an embodiment of the present disclosure provides a system for playing an online game, wherein the system comprises:

A plurality of player devices associated with the online game; and a server arrangement communicably coupled with the plurality of player devices, wherein the server arrangement is configured to:

receive a request from at least one player device, among the plurality of player devices, to initiate the online game;

determine at least one passive player device, among the plurality of player devices, based on a predefined condition;

transmit an authorization request to the at least one passive player device to play the online game as a virtual player;

receive an authorization response from the at least one passive player device;

create at least one virtual player for the at least one passive player device, based upon the received authorization response, wherein one virtual player is created for one passive player device; and initiate the online game among the at least one virtual player and the at least one player device, wherein the at least one passive player device is different from the at least one player device.

In another aspect, an embodiment of the present disclosure provides a method for playing an online game, wherein the method comprises:

receiving a request, at a server arrangement, from at least one player device among a plurality of player devices to initiate the online game;

determining at least one passive player device, among the plurality of player devices, based on a predefined condition;

transmitting an authorization request to the at least one passive player device to play the online game as a virtual player;

receiving an authorization response from the at least one passive player device;

creating at least one virtual player for the at least one passive player device, based upon the received authorization response, wherein one virtual player is created for one passive player device; and initiating the online game among the at least one virtual player and the at least one player device, wherein the at least one passive player device is different from the at least one player device.

Embodiments of the present disclosure substantially eliminate or at least partially address the aforementioned problems in the prior art, and facilitates a reliable, time-efficient, easy to implement and an optimized system for playing the online game.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
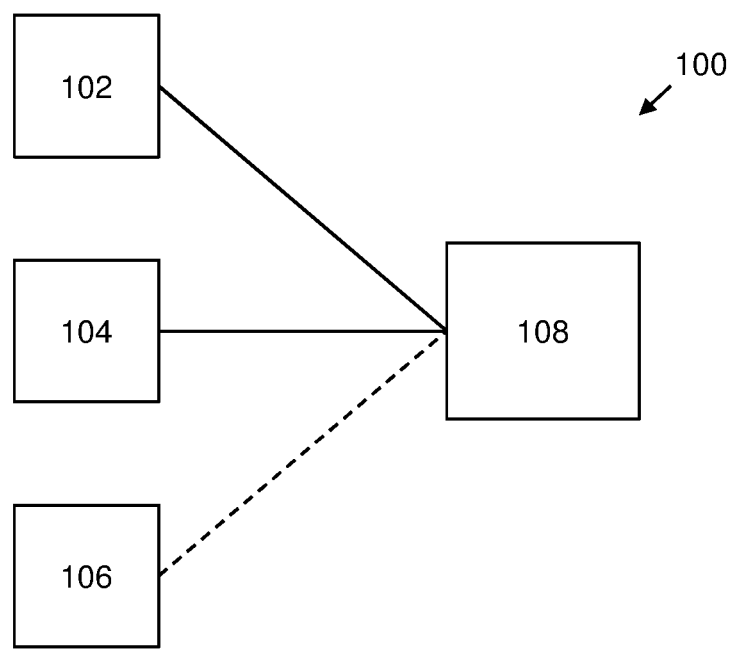
FIG. 1 illustrates a block diagram of a system for playing an online game, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for playing an online game, wherein the system comprises:
 a plurality of player devices associated with the online game; and
 a server arrangement communicably coupled with the plurality of player devices, wherein the server arrangement is configured to:
  receive a request from at least one player device, among the plurality of player devices, to initiate the online game;
  determine at least one passive player device, among the plurality of player devices, based on a predefined condition;
  transmit an authorization request to the at least one passive player device to play the online game as a virtual player;
  receive an authorization response from the at least one passive player device;
  create at least one virtual player for the at least one passive player device, based upon the received authorization response, wherein one virtual player is created for one passive player device; and
  initiate the online game among the at least one virtual player and the at least one player device, wherein the at least one passive player device is different from the at least one player device.

In another aspect, an embodiment of the present disclosure provides a method for playing an online game, wherein the method comprises:
 receiving a request, at a server arrangement, from at least one player device among a plurality of player devices to initiate the online game;
 determining at least one passive player device, among the plurality of player devices, based on a predefined condition;
 transmitting an authorization request to the at least one passive player device to play the online game as a virtual player;
 receiving an authorization response from the at least one passive player device;
 creating at least one virtual player for the at least one passive player device, based upon the received authorization response, wherein one virtual player is created for one passive player device; and
 initiating the online game among the at least one virtual player and the at least one player device, wherein the at least one passive player device is different from the at least one player device.

The present disclosure seeks to provide a system and a method for playing the online game. The present disclosure determines the at least one passive player device among the plurality of player devices. Furthermore, the server arrangement is configured to transmit the authorization request to the at least one passive player device to play as the virtual player. In response to such authorization request, the server arrangement receives the authorization response from the at least one passive player device and creates the virtual player. Furthermore, the online game is initiated among the player devices and the virtual player. Beneficially, the present disclosure facilitates the multiplayer online game among the player devices and the virtual player. Such virtual player enables a safe cost-efficient, easy to implement, and reliable system for playing the online game.

It will be appreciated that the online game relates to structured form of play that is either partially or primarily played over a communication network. The online game can be played by a single player or multiple players. The examples of the online game may include, but are not limited to, wager-based game such as a game of chance, a slot machine or any other betting game, a castle game, and a strategy-based game (e.g., a city building game). Optionally, the online game is a multi-player game. In an example, the multi-player game may be a group game such that various players from different locations may play an online game as a group. Notably, the players play the online game using the plurality of player devices.

As mentioned previously, the system comprises the plurality of player devices associated with the online game. Throughout the present disclosure, the term "player device" used herein relates to an electronic computing device on which a player plays the online game. Examples of the plurality of player devices may include, but are not limited to, a personal computer, a hand-held computing device, a tablet, a game console, a laptop, a mobile computer, a wearable computer, a communication device such as a cell phone, and a personal digital assistant, a video slot machine, a video poker machine, a kiosk, a casino personal device, and the like. In an embodiment, the plurality of player devices may be hardware, firmware, or a combination of these operable to receive the information. Moreover, the plurality of player devices include a plurality of electronic components for example, such as a microprocessor, a graphics processor unit (GPU), a memory unit, a plurality of sensors, a battery, and a user interface.

As mentioned previously, the system comprises the server arrangement communicably coupled with the plurality of player devices. The term "server arrangement" used herein relates to a structure and/or module that include programmable and/or non-programmable components configured to receive, store, process and/or share the online game related data. In an example, the server arrangement may include components such as a memory unit, a processor, a network adapter and the like, to receive, store, process and/or share the online game related data. Optionally, the memory unit stores game related data (for instance, number of players, winners, rewards awarded to the winner) in a database.

The server arrangement can include a single server or multiple servers communicably coupled with each other. The server arrangement is operable to execute online game related data. Optionally, the server arrangement is a game server or a server deployed in a cloud environment which is connected to the remote servers. Optionally, the server arrangement is implemented as two or more servers operating in a parallel and/or in a distributed architecture.

Furthermore, the server arrangement is communicably coupled with the plurality of player devices through the communication network. Optionally, the plurality of player devices are communicably coupled to the server arrangement via a wired network, a wireless network, or any combination thereof. Examples of the communication network between plurality of player devices and the server arrangement include, but are not limited to, Local Area Networks (LANs), Wide Area Networks (WANs), radio network, Internet, radio networks, telecommunication networks. In an embodiment, the communication between the server arrangement and the plurality of player devices occurs over short-range networks and/or long-range networks.

As mentioned previously, the server arrangement is configured to receive the request from the at least one player device, among the plurality of player devices, to initiate the online game. Throughout the present disclosure, the phrase "request from the at least one player device" used herein relates to an activity performed by the player on an associated player device to initiate the online game. It will be appreciated that the activity performed by the player relates to interaction of the player with the player device to initiate the online game. Notably, the player interacts with the user interface of the at least one player device. Examples of the user interface include, but are not limited to, a touch-sensitive surface, a mouse, a keyboard, a joystick, a gesture-based controller, a display screen (for example, such as flat panel display, liquid crystal display, light-emitting diode and the like). In an example, if the user interface of the at least one player device is a touch-sensitive surface; the player interacts with the online game by tactile input by using fingers or a stylus. In another example, if the user interface is a gesture-based controller, the player interacts with the user interface through hovering the hand and/or other body parts. In yet another example, if the user interface is the display screen, the player may use a mouse or a touchpad to interact with the online game. Such interaction related information of the player with the user interface is transmitted to the server arrangement.

As mentioned previously, the server arrangement is configured to determine the at least one passive player device, among the plurality of player devices, based on a predefined condition. Throughout the present disclosure, the term "at least one passive player device" used herein relates to a player device, associated with the online game, which has not provided a request to initiate the online game. Notably, the server arrangement is configured to determine the at least one player device associated with the online game that has not provided the request to initiate the online game. In an embodiment, the server arrangement determines the at least one passive device by analysing all the player devices that have previously played the online game. For example, if a player device P1 has requested to initiate a multi-player online game "XXX". In such an example, the server arrangement analyses all the player devices that have previously played the multi-player online game "XXX". In another example, the server arrangement may analyse all the player devices with whom the player device P1 had previously played the multi-player online game "XXX" to determine the passive player device. In such an instance, the server arrangement may also determine if the player device P1 has a predefined group of player devices. In such a case, the player devices P1, P2, P3, and P4 may have formed a group to play the multi-player online game "XXX". In such an example, player devices P1, P2, and P3 have requested to initiate the multi-player online game "XXX", whilst the player device P4 has not requested to initiate the online game.

Optionally, the at least one passive player device operates in a dormant mode. It will be appreciated that the at least one passive player device operating in the dormant mode is temporarily inactive. In an example, in the dormant mode, the at least one passive player device may not request the server arrangement to initiate the online game.

Throughout the present disclosure the term "predefined condition" used herein relates to a prerequisite required for determination of the at least one passive player device. In one embodiment, the predefined condition is determined by an operator of the server arrangement. In another embodiment, the predefined condition is defined by a developer of the online game. In yet another embodiment, the predefined condition is defined by the player of the plurality of player devices. Thus, in such a case, the predefined condition may be different for different player devices. Optionally, the predefined condition includes a predefined time limit, wherein when the at least one passive device does not request the server arrangement within the predefined time limit, the player device is determined as the passive player device.

As mentioned previously, the server arrangement is configured to transmit an authorization request to the at least one passive player device to play the online game as the virtual player. Throughout the present disclosure, the term "authorization request" used herein relates to a query transmitted to the at least one passive player device for device to play the online game as the virtual player. Notably, the authorization request is transmitted to receive permission of the player of the at least one passive player device to play the online game as the virtual player. In one embodiment, the authorization request is transmitted in a textual format. In another embodiment, the authorization request is transmitted in an image format. In such an embodiment, the image format can be JPEG, JFIF, TIFF, GIF, BMP, PNG and the like. In another embodiment, the authorization request is transmitted in a video format. In such an embodiment, the video format can be AVI (Audio Video Interleave), FLV (Flash Video Format), WMV (Windows Media Video), MOV (Apple Quick-Time Movie), MP4 (Moving Pictures Expert Group 4) and the like. In another embodiment, the authorization request is transmitted in an audio format. In such an embodiment, the audio format can be Waveform Audio File Format, Audio Interchange File Format, MPEG-1 Audio Layer 3, and Advanced Audio Coding. In yet another embodiment, the authorization request is transmitted as a combination of textual, image, audio or video format. The authorization request includes information (for example, such as one or more questions, a set of rules, game levels and the like) with which the player interacts.

In an example, the server arrangement may send a push notification message to the player. In such an example, the push notification message may include "Would you like to join the game online or can we setup a virtual player for you to play instead?" It will be appreciated that the aforementioned push notification message can be transmitted to the at least one passive player device in the textual format, image format, video format, audio format or as a combination of any of the above format.

It will be appreciated that the virtual player relates to an autonomous program which can interact with the online game. Such autonomous programs are designed to behave like the player. Furthermore, such autonomous programs can apply strategies based on authorization response provided by the at least one passive player device. Optionally, the virtual player associated with the at least one passive player device is a bot. Throughout the present disclosure, the term "bot" used herein relates to non-human players representing the at least one passive player device. The bots are artificial intelligence enabled with instructions to play the online game.

Optionally, the predefined condition comprises setting a dormant time for the at least one passive player device, wherein the server arrangement is configured to transmit the authorization request to the at least one passive player device upon expiration of the dormant time.

Throughout the present disclosure, the term "dormant time" used herein relates to a period during in which the at least one passive player device can transmit the request to the server arrangement to initiate the online game. It will be appreciated that the dormant time is calculated after the request for initiation of the online game is received from the at least one passive player device. In an example, the server arrangement may wait for 10 minutes to receive the request from the at least one player device. If there is no response received from the at least one player device within 10 minutes, the server arrangement determines that the at least one player device is a passive player device. Furthermore, upon expiration of 10 minutes, the server arrangement transmits the authorization request to the determined at least one passive player device.

As mentioned previously, the server arrangement is configured to receive the authorization response from the at least one passive player device. Throughout the present disclosure, the term "authorization response" used herein relates to a reply, namely an answer, provided by the at least one passive player device to the authorization request. Notably, the authorization response is provided by the player associated with the at least one passive player device. In this regard, the player interacts with the at least one passive player device to provide the authorization response. In one embodiment, the authorization response is provided in a textual format. In another embodiment, the authorization response is provided in an image format. In such an embodiment, the image format can be JPEG, JFIF, TIFF, GIF, BMP, PNG and the like. In another embodiment, the response is provided in a video format. In such an embodiment, the video format can be AVI (Audio Video Interleave), FLV (Flash Video Format), WMV (Windows Media Video), MOV (Apple QuickTime Movie), MP4 (Moving Pictures Expert Group 4) and the like. In another embodiment, the authorization response is provided in an audio format. In such an embodiment, the audio format can be Waveform Audio File Format, Audio Interchange File Format, MPEG-1 Audio Layer 3, and Advanced Audio Coding. In yet another embodiment, the authorization response is provided as a combination of textual, image, audio or video format.

Referring to the aforementioned example, the player of the at least one passive player device may provide an authorization response comprising "Play with Bot" to the authorization request "Would you like to join the game online or can we setup a virtual player for you to play instead?".

Optionally, the authorization response comprises a plurality of instructions for the at least one virtual player to play the online game. It will be appreciated that the plurality of instructions comprises information about how the virtual player should play the online game. Beneficially, such plurality of instructions enables the player of the at least one passive player device to participate in the online game even when the player is busy with some other task. In an example, when the player is travelling to a region having limited network connection with the server arrangement, the player may provide plurality of instructions to the server arrangement for creation of the virtual player.

As mentioned previously, the server arrangement is configured to create the at least one virtual player for the at least one passive player device, based upon the received authorization response, wherein one virtual player is created for one passive player device. The server arrangement analyses the received authorization response from the at least one passive player device. Notably, the server arrangement processes the plurality of instructions provided by the at least one passive player device to create the at least one virtual player for corresponding at least one passive player device. It will be appreciated that the plurality of instructions varies from one passive player device to another passive player device. Therefore, one virtual player is created for one passive player device, wherein each virtual player is created based on different plurality of instructions to play the online game.

Optionally, the plurality of instructions for playing the online game are based on set of rules provided by the at least one passive player device. Optionally, in this regard, the player of the at least one passive player device may include the set of rules for the at least one virtual player to play the online game. In an example, when the at least one passive player device receive an authorization request to play the online game "poker", the player associated with the at least one passive player device may provide the authorization response to the received authorization request. In such an example, the authorization response may comprise the plurality of instructions, wherein the plurality of instructions may include "Use following rule set: play 100 rounds, place bet of 1/200 of all funds in my possession to each of the rounds".

Alternatively, optionally, the plurality of instructions for playing the online game are based on historical playing style of the player associated with the at least one passive player device. The server arrangement is configured to host one or more artificial intelligence-based learning algorithms to learn a playing style of the player associated with the at least one passive player device. Optionally, in this regard, the artificial intelligence-based learning algorithms employ deep learning method to accurately enact the playing style of the player associated with the at least one passive player device. Optionally, the artificial intelligence-based learning algorithms are stored in the memory unit of the server arrangement. In an example, when the at least one passive player device receive an authorization request to play the online game "poker", the player associated with the at least one passive player device may provide the authorization response to the received authorization request. In such an example, the authorization response may comprise the plurality of instructions, wherein the plurality of instructions may include "mimic my normal playing style". In such an example, the server arrangement uses the artificial intelligence-based learning algorithms to learn the historical playing style of the player associated with the at least one passive player device. In such an example, the server arrangement may analyze the activities that were previously performed by the player while playing the online game and determines a set of rule for the virtual player to follow while playing the online game. For example, if the player has previously placed a bet of 2/100 of all funds in his possession on most of the rounds played, the server arrangement defines a rule to place a bet of 2/100 for a current session of the online game.

In another example, if the player associated with the at least one passive player device has not defined any set of rules; the server arrangement may use the historical playing style of the player to instruct the virtual player to play the game. In such a case, the server arrangement may transmit a notification to the at least one passive player device indicating the determined set of rule, determined using historical playing style of the player. The player may provide a feedback to the determined set of rules. For example, if the player wants to proceed with the determined set of rules or wants to make any amendments.

In an embodiment, the player associated with the at least one passive player device may define and store the set of rules within the at least one passive player device. In such an embodiment, if the player, playing the online game, is disconnected from the server arrangement, the server arrangement may utilize the stored set of rules to create the virtual player for the player.

As mentioned previously, the server arrangement is configured to initiate the online game among the at least one virtual player and the at least one player device, wherein the at least one passive player device is different from the at least one player device. It will be appreciated that the online game is initiated between at least one player device, from which the request to initiate the online game is received, and at least passive player device from which the authorization response is received. Optionally, the online game is displayed on the user interface of the at least one player device.

In an example, a plurality of player devices include player devices P1, P2, and P3, wherein the player devices P1, P2, and P3 are associated with a multi-player online game G1. The player devices P1 and P2 have requested to initiate the multi-player online game G1. The server arrangement receives the request from the player devices P1 and P2. In such an example, the server arrangement waits for 5 minutes for the player device P3 to receive a request to initiate the multi-player online game G1 therefrom. In such a case, the server arrangement does not receive the request within 5 minutes from the player device P3 and thus determine the player device P3 as a passive player device. It will be appreciated that the aforementioned waiting period of the server arrangement is the predefined condition. Such predefined conditions may be changed at any instant of time. Thereafter, the server arrangement may transmit an authorization request in form of a text notification to the passive player device P3. The text notification may read "Do you want a bot to play on your behalf, please provide instructions". Subsequently, the server arrangement receives an authorization response from a player of the passive player device P3 in from of an audio message. The audio message may include "yes, play 7 rounds by mimicking my previous playing style and bet 5, 1, 3, 4, 6, 10 and 11 respectively on each round". Thereafter, the server arrangement creates a virtual player V1 represent the passive player device P3. Subsequently, the server arrangement initiates the multi-player online game G1 among the player devices P1, P2 and virtual player V1. It will be appreciated that the virtual player V1 follows the playing style of the player of the passive player device P3 and bet 5, 1, 3, 4, 6, 10 and 11 respectively for each round of game.

Optionally, the server arrangement is configured to store the online game sessions played by the at least one virtual player. In one embodiment, the game sessions may be stored in a textual format. In another embodiment, the game sessions may be stored in an image format. In another embodiment, the game sessions may be stored in a video or audio format. In yet another embodiment, the online game sessions may be stored as a combination of textual, image, video or audio format. Optionally, the stored game sessions are transmitted to the at least one passive player device (represented by the virtual player). In an example, the server arrangement may generate a summary of the game sessions and provide each and every move made by the virtual player. In another example, the server arrangement may generate a summary of the outcome of the online game. Furthermore, optionally, the summary is transmitted to the passive player device associated with the virtual player for the perusal of player of the at least one passive player device.

In an embodiment, the online game is an unpredictable game such as a poker game. In such an embodiment, the outcome of the online game is dependent on each player, playing the online game. In such a case, the server arrangement is configured to transmit the stored game session to the player of the at least one passive player device when the game is over.

In another embodiment, if the online game is predictable game, such as predicting outcome of coin tossing, slot game or any similar gender game, outcome of the online game is independent of all other players playing the online game. In such an embodiment, the server arrangement is configured to transmit the stored game session to the player of the at least one passive player device immediately, even if the other players are still playing the online game. In such a case, since probability of correctly guessing the outcome of the coin tossing is 0.5, the server arrangement may automatically provide the outcome of the game without receiving the instructions related to the outcome of the coin tossing.

DETAILED DESCRIPTION OF THE DRAWINGS

Referring to FIG. 1, there is shown a block diagram of system 100 for playing an online game, in accordance with an embodiment of the present disclosure. As shown, the system 100 comprises at least one player device (depicted as player devices 102, 104 and 106) and a server arrangement 108 communicably coupled with the at least one player device 102-106. The solid lines indicate a communication link between the server arrangement 108 and the player devices 102-104. The dotted/dashed line indicates a communication link between the server arrangement and a passive player device. The server arrangement 108 is configured to receive a request from at least one player device 102-104, among the plurality of player devices 102-106, to initiate the online game, determine at least one passive player device 106, among the plurality of player devices 102-106, based on a predefined condition, transmit an authorization request to the at least one passive player device 106 to play the online game as a virtual player, receive an authorization response from the at least one passive player device 106, create at least one virtual player for the at least one passive player device 106, based upon the received authorization response, wherein one virtual player is created for one passive player device 106; and initiate the online game among the at least one virtual player and the at least one player device 102-104, wherein the at least one passive player device 106 is different from the at least one player device 102-104.

Figure 2:
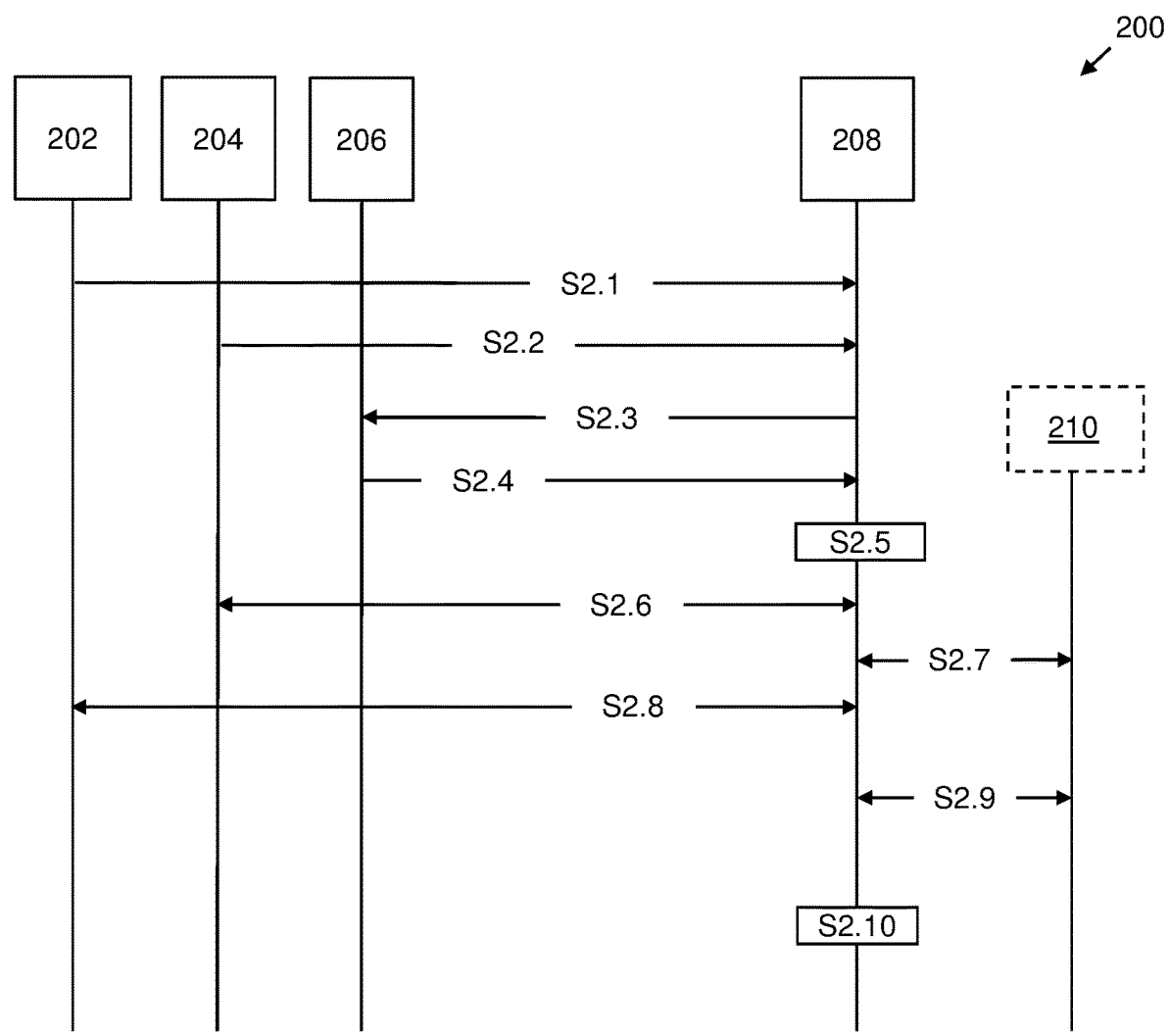
FIG. 2 is an exemplary sequence diagram of implementation of a system (for example, such as the system of FIG. 1), in accordance with an embodiment of the present disclosure.

Referring to FIG. 2, illustrated is a schematic exemplary sequence diagram of implementation of a system 200 (for example, such as the system 100 of FIG. 1), in accordance with an embodiment of the present disclosure. As shown, a plurality of player devices (depicted as player devices 202, 204 and 206) communicably coupled with a server arrangement 208. At a step S2.1, the server arrangement 208 is configured to receive a request from at least one player device 202, among the plurality of player devices 202-206, to initiate an online game. At a step S2.2, the server arrangement 208 receives a request from at least one player device 204, among the plurality of player devices 202-206, to initiate the online game. At a step S2.3, the server arrangement 208 is configured to: determine at least one passive player device 206, among the plurality of player devices 202-206, based on a predefined condition and transmits an authorization request to the at least one passive player device 206 to play the online game as a virtual player. At a step S2.4, the server arrangement 208 receives an authorization response from the at least one passive player device 206, the authorization response is transmitted in reply to the received authorization request. At a step S2.5, the server arrangement 208 creates at least one virtual player 210 for the at least one passive player device 206, based upon the received authorization response, wherein one virtual player 210 is created for one passive player device 206. At a step S2.6, the online game is initiated between the server arrangement 208 and the player device 204. At a step S2.7, the virtual player 210 makes a game action. At a step S2.8, the player device 202 makes a game action. At a step S2.9, the virtual player 210 makes a game action. It will be appreciated that the steps of making game actions can be carried out iteratively in any order of execution. At step 2.10, the server arrangement 208 stores the one or more game actions performed by the player devices 202-204 and/or the server arrangement 208. The server arrangement 208 may generate a summary of the online game and transmit to the at least one player device.

Figure 3:
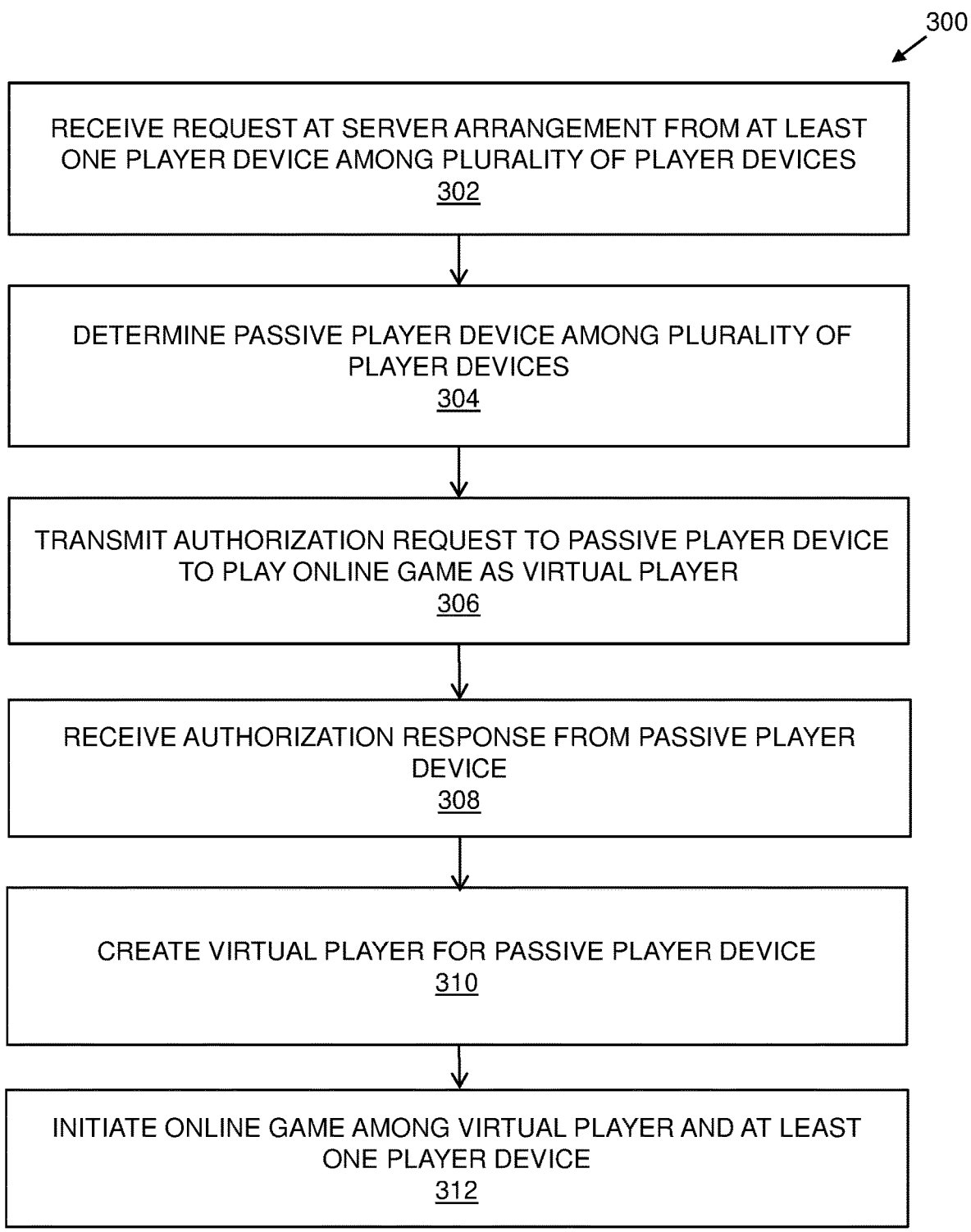
FIG. 3 is an illustration of steps of a method for playing an online game, in accordance with an embodiment of the present disclosure.

Referring to FIG. 3, illustrated are steps of a method 300 for playing an online game, in accordance with an embodiment of the present disclosure. At a step 302, a request is received, at a server arrangement, from at least one player device, among the plurality of player devices, to initiate the online game. At a step 304, at least one passive player device is determined, among the plurality of player devices, based on a predefined condition. At a step 306, an authorization request is transmitted to the at least one passive player device to play the online game as a virtual player. At a step 308, an authorization response is received from the at least one passive player device. At a step 310, at least one virtual player is created for the at least one passive player device, based upon the received authorization response, wherein one virtual player is created for one passive player device. At a step 312 the online game is initiated among the at least one virtual player and the at least one player device, wherein the at least one passive player device is different from the at least one player device.

The steps 302 to 312 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for playing an online game, wherein the system comprises:

a server that includes a processor configured to execute non-transitory machine readable instructions;

a plurality of player devices, the plurality of player devices communicatively coupled to the server, the server being configured to facilitate a playing of the online game by the plurality of player devices, wherein upon execution of the non-transitory machine readable instructions, the server is configured to:

determine that at least one player device among the plurality of player devices is a passive player device;

transmit a virtual player authorization request to the passive player device;

receive a virtual player authorization response from the passive player device;

create a virtual player for the passive player device based upon the received virtual player authorization response, wherein the server is configured to create the virtual player by:

identifying an instruction message in the virtual player authorization response, the instruction message including a set of game playing instructions;

associating the set of game playing instructions with the virtual player, wherein the set of playing instructions establish a playing style and playing rules for the virtual player; and wherein the server is further configured to initiate a playing of the online game between the virtual player and at least one other player device of the plurality of player devices, wherein the virtual player executes playing of the online game according to the set of playing instructions responsive to plays of the at least one other player device playing the online game.

2. The system according to claim 1, wherein the online game is a multi-player game.

3. The system according to claim 1, wherein the server is configured to determine that the at least one player device is a passive player device when a request to initiate the online game is not received from the at least one player device within a predefined time limit.

4. The system according to claim 1, wherein the server is configured to analyze past game play of the at least one player device identified as the passive player device and develop the set of playing instructions based upon the past game play.

5. The system according to claim 1, wherein the server is configured to determine that the at least one player device is the passive player device when the at least one player device is disconnected from the server, and the server is further configured to utilize a stored set of rules to create the virtual player.

6. The system according to claim 1, wherein the virtual player is a bot.

7. The system according to claim 1, wherein the set of game playing instructions are based a historical playing style of a player associated with the passive player device, wherein the server is configured to learn the historical playing style by analyzing game actions of the player while previously playing the online game and determine the set of game playing instructions based on the analyzed game actions.

8. The system according to claim 1, wherein the server is configured to initiate the playing of the online game upon receipt of a request to initiate the playing of the online game by the at least one other player device.

9. The system according to claim 1 wherein an interaction of the virtual player with the at least one other player device is presented on a user interface of the at least one other player device and a user interface of a player device associated with the virtual player.

10. The system according to claim 1, wherein the server is configured to detect interaction with user interfaces of the at least one other player device responsive to execution of the set of playing instructions by the virtual player and update a game status on the user interface of the at least one other player device.

11. A method of playing an online game in a system that includes a server, a processor configured to execute non-transitory machine readable instructions, and a plurality of player devices, the plurality of player devices communicatively coupled to the server, the server being configured to facilitate a playing of the online game by the plurality of player devices, wherein the method comprises execution of the non-transitory machine readable instructions to cause the server to:
  determine that at least one player device among the plurality of player devices is a passive player device;
  transmit a virtual player authorization request to the passive player device;
  receive a virtual player authorization response from the passive player device;
  create a virtual player for the passive player device based upon the received virtual player authorization response, wherein the method includes the server creating the virtual player by:
  identifying an instruction message in the virtual player authorization response, the instruction message including a set of game playing instructions;
  associating the set of game playing instructions with the virtual player, wherein the set of playing instructions establish a playing style and playing rules for the virtual player; and wherein the method further includes the server initiating a playing of the online game between the virtual player and at least one other player device of the plurality of player devices, wherein the virtual player executes playing of the online game according to the set of playing instructions responsive to plays of the at least one other player device playing the online game.

12. The method according to claim 11, wherein the online game is a multi-player game.

13. The method according to claim 11, wherein the method includes the server determining that that the at least one player device is a passive player device when a request to initiate the online game is not received from the at least one player device within a predefined time limit.

14. The method according to claim 11, wherein the method includes the server analyzing past game play of the at least one player device identified as the passive player device and developing the set of playing instructions based upon the past game play.

15. The method according to claim 11, wherein the method includes the server determining that the at least one player device is the passive player device when the at least one player device is disconnected from the server, and utilizing a stored set of rules to create the virtual player.

16. The method according to claim 11, wherein the virtual player is a bot.

17. The method according to claim 11, wherein the set of game playing instructions are based a historical playing style of a player associated with the passive player device, wherein the method includes the server learning the historical playing style by analyzing game actions of the player while previously playing the online game and determine the set of game playing instructions based on the analyzed game actions.

18. The method according to claim 11, wherein the method further includes the server initiating the playing of the online game upon receipt of a request to initiate the playing of the online game by the at least one other player device.

19. The method according to claim 11 wherein the method further includes presenting an interaction of the virtual player with the at least one other player device on a user interface of the at least one other player device and a user interface of a player device associated with the virtual player.

20. The method according to claim 11, wherein the method includes the server detecting an interaction with user interfaces of the at least one other player device responsive to execution of the set of playing instructions by the virtual player and updating a game status on the user interface of the at least one other player device.

* * * * *